8498X
J. Stewart.
Thrashing Mach.
Patented Nov. 17, 1834.
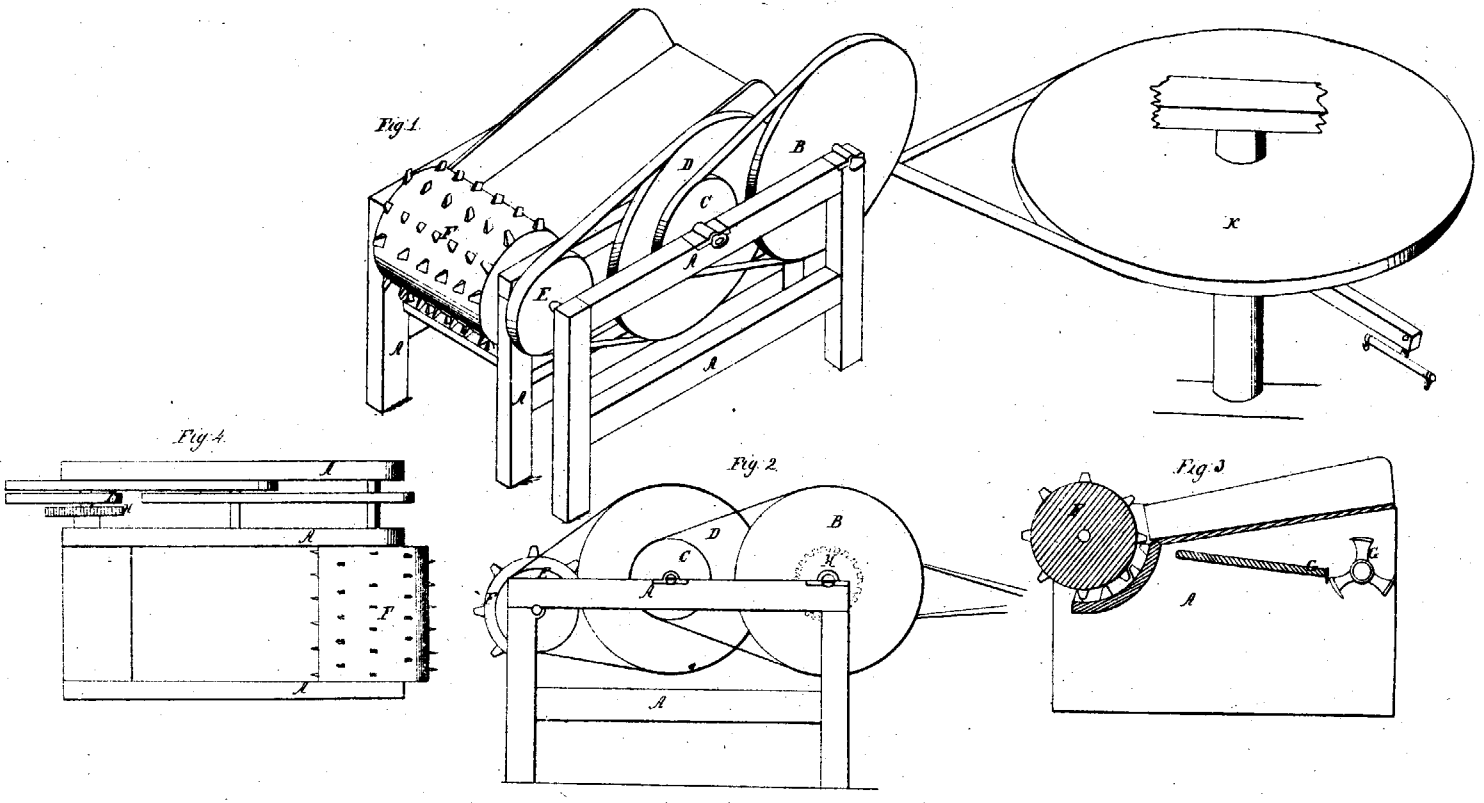

8498x    Nov. 17 1834    1

John Stewart Cambridge Md.

Letters Patent

8498X

The Schedule referred to in these Letters Patent and making part of the same containing a description in the words of the said John Stewart himself of his Improvement in the Threshing Machine and Straw-Cutter.

To all to whom these presents shall come Be it known that I John Stewart of the town of Cambridge in the County of Dorchester and State of Maryland have invented a new and useful improvement in the machine for Threshing grain and cutting Straw and that the following is a full and exact description thereof—

I make a Threshing Machine of the usual construction with the exception that the side of the frame which has the Whirle [illegible] on the axle of the Threshing Cylinder is made double to receive a sett of Wheels which are intended to give the velocity required to the Threshing Cylinder— these wheels are made as follows.— at the top of the frame and at the opposite side of the Threshing Cylinder is an axle on which is a band Wheel of about five feet diameter— a whirl which receives the band from the horizontal band wheel to be hereafter mentioned and a small Cog wheel of eighteen inches diameter which gives motion to the Straw Cutter to be hereafter described. Immediately below this axis is another similar to it on which is a small whirl that receives its motion from the band wheel above described and [illegible] the side of it a band wheel of five feet diameter which gives [illegible] [illegible] whirl on the axis of the Threshing Machine.

At some distance from the Threshing machine is erected a frame in which works a horizontal band wheel of ten or twelve feet [illegible] to be propelled by horse or other animal power. A band from this wheel [illegible] around a whirl as above described. The Straw or fodder Cutter [illegible] and which is as long as the width of the Threshing Machine [illegible] the one end there is a small Cog wheel receiving its [illegible] from a cog wheel as before mentioned and on the other end are attached the cutting knives. On the side of the frame is a feeding box as in all other 38. 8498x Nov. 17, 1834

[illegible] Cutters [illegible] with Steel made to correspond with the Cutters. All the ax
les of the Machine work on Centres and any of them can be removed from the
Machine at pleasure the Machine operates in the following manner. At
[illegible] the animal power is attached to the same on the Shaft of the horizontal
band wheel and as he walks by means of the combination of band wheels the
whole Machine is put in Motion. The Threshing Machine and Straw Cutter
are not intended to work at the same time. When the Threshing Machine
is operated the Straw Cutter is removed and when the Straw Cutter is operated
the [illegible] band of the Threshing Machine must be taken off as also the
[illegible] from the Threshing Cylinder. I do not claim to be the Inventor of the
Threshing Machine or Straw Cutter as both are public property - but what
I do claim to be the inventor of and for which I ask Letters Patent is the
combination of the [illegible] the Machine and the general arrangement of
the several parts as above described.

In testimony that the above is a full and exact description
of my Improvement I have hereunto subscribed my name this 14 day of
[illegible] 1834

[illegible] Stewart

Witness
Robt Clark
Wm Wallis

Ex'd 119 C

Drawing

[675 [illegible]]